US005224721A

United States Patent [19]

Santmann

[11] Patent Number: 5,224,721

[45] Date of Patent: Jul. 6, 1993

[54] WALKER HAVING FOLDING AND PIVOTING SEAT APPARATUS

[76] Inventor: Theresa M. Santmann, 66 Cedar La., Babylon, N.Y. 11702

[21] Appl. No.: 919,065

[22] Filed: Jul. 23, 1992

[51] Int. Cl.[5] .......... B62B 7/00

[52] U.S. Cl. .......... 280/87.051; 280/87.05; 135/69; 297/6; 482/68

[58] Field of Search .......... 280/87.021, 87.041, 280/87.05, 87.051, 657, 658; 135/67; 297/5, 6, 13, 335; 482/68

[56] References Cited

U.S. PATENT DOCUMENTS

| | | | |
|---|---|---|---|
| 2,776,701 | 1/1957 | Denis | 297/6 X |
| 3,256,035 | 6/1966 | Garringer | 280/87.021 X |
| 3,778,052 | 12/1973 | Andow et al. | 280/87.021 X |
| 4,342,465 | 8/1982 | Stillings | 280/87.051 |
| 4,384,713 | 5/1983 | Deutsch et al. | 482/68 |
| 4,621,804 | 11/1986 | Mueller | 280/87.051 X |
| 5,058,912 | 10/1991 | Harroun | 280/87.021 |
| 5,083,806 | 1/1992 | Brown | 280/87.051 X |
| 5,083,836 | 1/1992 | Beasley | 297/13 |
| 5,112,044 | 5/1992 | Dubats | 297/5 X |
| 5,148,559 | 9/1992 | Morris | 297/6 X |
| 5,172,715 | 12/1992 | Webb | 280/87.05 |

FOREIGN PATENT DOCUMENTS

| | | | |
|---|---|---|---|
| 1103142 | 6/1981 | Canada | 135/67 |
| 1025100 | 2/1958 | Fed. Rep. of Germany | 297/6 |
| 1240676 | 7/1971 | United Kingdom | 297/6 |
| 8905675 | 6/1989 | World Int. Prop. O. | 296/6 |

*Primary Examiner*—Brian Johnson
*Attorney, Agent, or Firm*—Shenier & O'Connor

[57] ABSTRACT

An improved walker in which a gate which is pivoted on one rear leg for movement from an open position to a closed position at which it engages a fitting carried by the other rear leg, supports a seat for pivotal movement from a raised inoperative position to a lowered operative position. An element operative in the lowered position of the seat prevents the gate from moving to an open position. Interengageable elements operative in the open position of the gate prevent the seat from being lowered.

15 Claims, 4 Drawing Sheets

FIG. 3
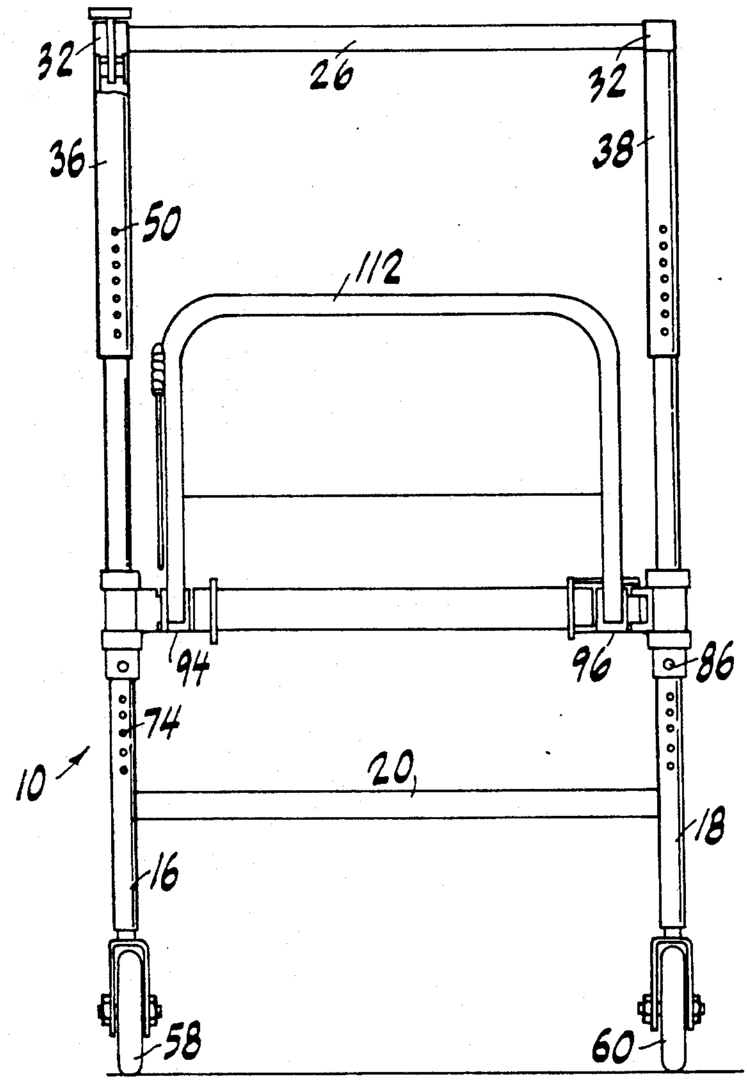
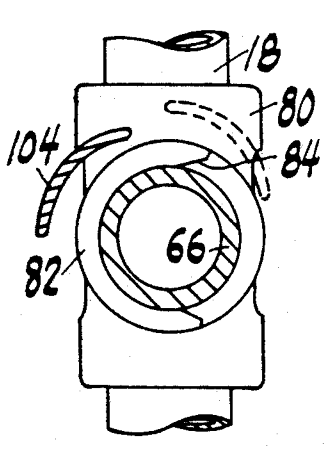
FIG. 6
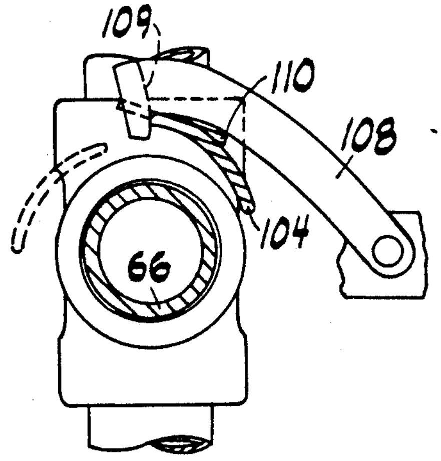
FIG. 7

WALKER HAVING FOLDING AND PIVOTING SEAT APPARATUS

FIELD OF THE INVENTION

The invention is in the field of walkers for infirm persons and more particularly relates to an improved walker which overcomes defects of walkers of the prior art.

BACKGROUND OF THE INVENTION

There are known in the prior art walkers for assisting infirm persons in walking. While most of these devices are in some degree satisfactory, they suffer from a number of defects. Most are not provided with seats for permitting the user to rest. Those which are provided with seats are not as easy to use as is desirable. Neither are they as safe as is desirable.

SUMMARY OF THE INVENTION

One object of the invention is to provide an improved walker which overcomes the defects of walkers of the prior art.

Another object of the invention is to provide an improved walker provided with a seat which can be lowered to operative position in a simple and expeditious manner.

A further object of the invention is to provide an improved walker having a rear gate which cannot be opened with the walker seat lowered.

Another object of the invention is to provide an improved walker having a rear gate carrying a seat and provided with means for preventing the seat from being lowered when the gate is opened.

A further object of the invention is to provide an improved walker for preventing injury to the user as a result of a fall within the walker.

A still further object of the invention is to provide an improved walker having wheels to which an adjustable retarding force may be applied.

Other and further objects of the invention will appear from the following description.

BRIEF DESCRIPTION OF THE DRAWINGS

In the accompanying drawings to which reference is made in the instant specification and which are to be read in conjunction therewith and in which like reference numerals are used to indicate like parts in the various views:

FIG. 3 is a rear elevation of the form of the improved walker shown in FIG. 1.

FIG. 6 is a fragmentary sectional view of the improved walker taken along the line 6—6 of FIG. 5.

FIG. 7 is a fragmentary sectional view similar to FIG. 6 illustrating the seat latching mechanism of the improved walker.

DESCRIPTION OF THE PREFERRED EMBODIMENT

Figure 2:
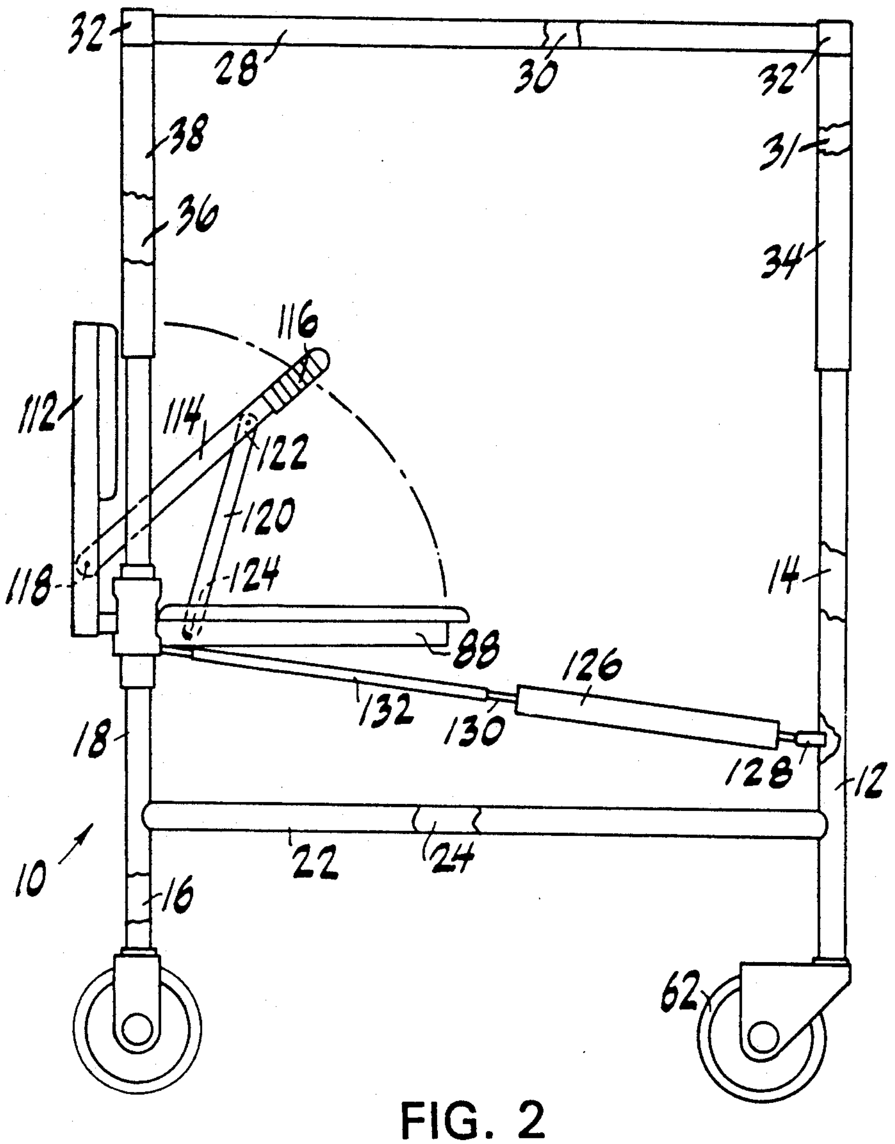
FIG. 2 is a right side elevation of the form of the improved walker shown in FIG. 1.

Referring now to the FIGS. 2 AND 3, the improved walker indicated generally by the reference character 10 includes a pair of front legs 12 and 14 and a pair of rear legs 16 and 18. A front bottom crossbar extends between legs 12 and 14 and is connected thereto in any suitable manner known to the art, such for example as by welding or the like. Respective bottom side bars 22 and 24 extend between legs 12 and 18 and between legs 14 and 16, and are connected thereto in any suitable manner known to the art.

An improved walker is provided with a front top rail 26 and respective upper side rails 28 and 30. The top side rail 28 extends between a pair of blocks 32 at the tops of a front tubular leg extension 34 and a rear tubular leg extension 38. The top side rail 30 extends between a second tubular front leg extension 31 and a second rear tubular leg extension 36. Rail 26 extends between the blocks 32 on the two front tubular members.

The tubular members 31, 34, 36 and 38 are adjustably supported on upwardly extending portions of the legs 14, 12, 16 and 18.

Figure 1:
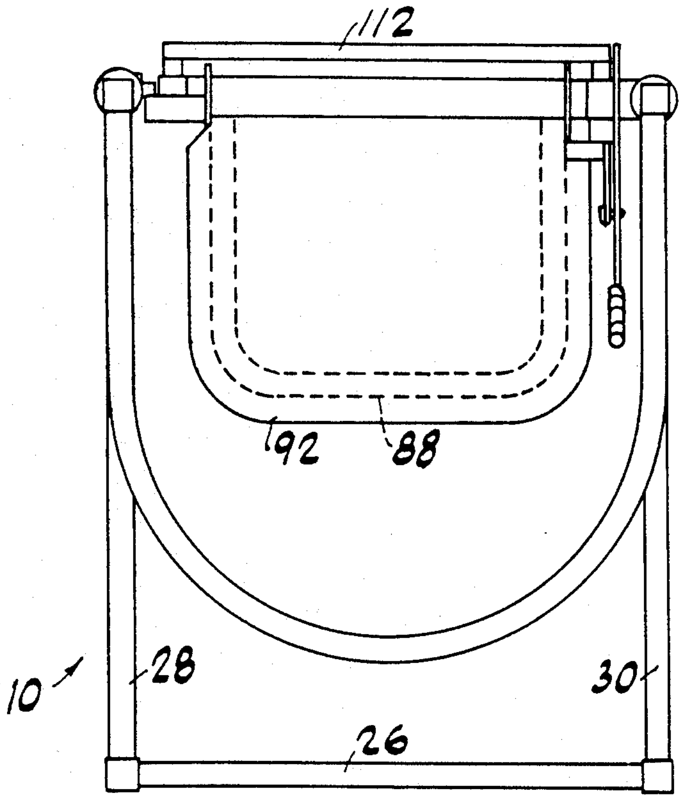
FIG. 1 is a top plan of the improved walker.
Figure 4:
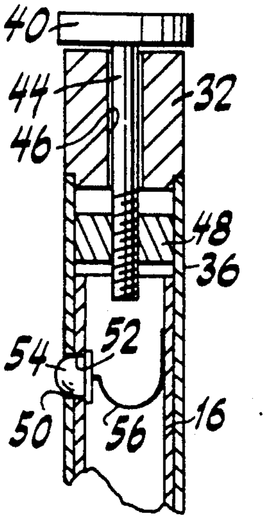
FIG. 4 is a fragmentary sectional view of a portion of the improved walker.

Referring now particularly to FIG. 4, there is shown the arrangement of the block 32 associated with the tubular member 36 supported on the upwardly extending portion of leg 16. A knurled knob 40 associated with the block 32 has a shank 44 which extends through a bore 46 in the block 32. The lower threaded end of the shank 44 is received by an internally threaded nut 48 or the like held in a fixed position within the tubular member 36. In this manner, the upper rails 26, 28 and 30 (FIG. 1) are firmly secured to the corresponding tubular members. At the same time, they can be removed for facilitating the height adjustment of the top rails.

The upward extension of leg 16 is formed with a hole 52 adapted to receive a button 54 urged into operative position by a spring 56. Button 54 is also adapted to be selectively received in one of a number of vertically spaced holes 50 in the tubular member 36 adjustably to position the member on the leg 16. In this manner, the height of the top rails is adjusted, preferably to about elbow height.

The walker includes a pair of rear wheels 58 and 60 (FIG. 3) supported in the legs 16 and 18 and a pair of front wheels, one wheel 62 (FIG. 2) of which is shown in the drawings, supported in the leg 12 in a manner to be described.

Figure 5:
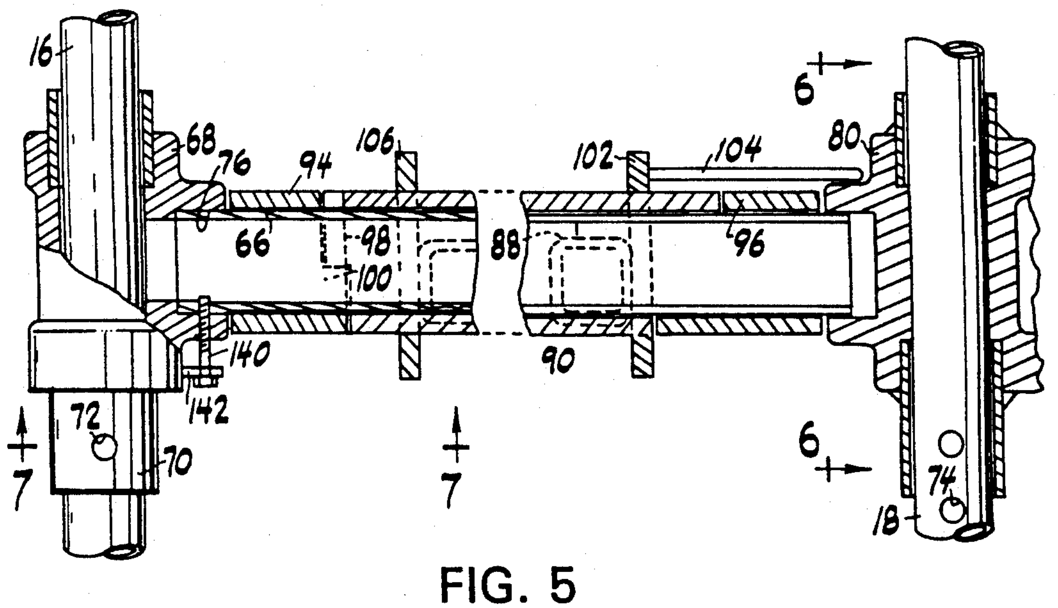
FIG. 5 is a fragmentary sectional view of the gate and seat support mechanism of the improved walker with parts broken away and with other parts shown in section.

Referring now more particularly to FIG. 5, the improved walker includes a gate bar 66 carried by a sleeve 68 positioned on the leg 16 by a support 70 for swinging movement around the leg 16. Support 70 has a hole 72 adapted selectively to be positioned in register with one of a number of vertically spaced holes 74 in the leg 16 and to be held in register therewith by any suitable element to adjust the vertical position of the gate bar 66. The left end of the gate bar 66, as viewed in FIG. 5, is received in a socket 76 formed on the sleeve 68 and is held in position therein by means of welding.

Referring now to FIGS. 5 and 6, a sleeve 80 supported on leg 18 is formed with a receptacle 82 provided with an opening 84 for receiving the right end of the gate bar 66 when the gate is closed.

A seat frame 88 is secured to a quill 90 by any suitable means, such for example as by welding. Any suitable means, such as welding, attaches respective left and right stop members 94 and 96 to the bar 66 adjacent to the sleeves 68 and 80. The stops 94 and 96 and the end of the quill 90 adjacent thereto are formed with interengageable stops 98 and 100 which limit the movement of the seat frame 88 in the down position thereof.

Referring to FIGS. 5 and 6, a collar 102 secured to the quill 90 adjacent to the right end thereof, carries a gate lock 104. In the lowered position of the seat, lock 104 occupies the full line position shown in FIG. 6. As will be apparent in this relative position of the parts, if an attempt is made to swing the bar 66 out of the opening 84 in the receptacle 82, lock 104 will engage the receptacle 82 to prevent the withdrawal.

Referring now to FIG. 7, with the gate open and the seat raised, a latch 108 pivotally supported on the seat back frame engages an edge of lock 104 to hold the seat up. As the gate is swung to its closed position, a lateral extension 109 on the latch 108 engages a strike 110 on the fitting 80. As the gate moves to the fully closed position, the strike pivots the latch clear of the lock 104. When the gate is reopened and the seat raised, latch 108 is freed to permit it to reengage the lock 104.

The walker includes a backrest 112 (FIG. 3) supported on the members 94 and 96. A seat operating lever 114 (FIG. 2) having a handle grip 116 is supported on a pivot, 118 carried by the backrest 112. One end of a link 120 is pivotally connected to a point on the lever 114 adjacent to the grip 116 by means of a pin 122. A second pin 124 connects the other end of the link 120 to the seat frame 88. From the structure just described, it will be seen that in response to movement of the lever 114 in a counterclockwise direction as viewed in FIG. 2, seat frame 88 will move from its lowered position shown in full lines in FIG. 2 to a raised position.

Figure 8:
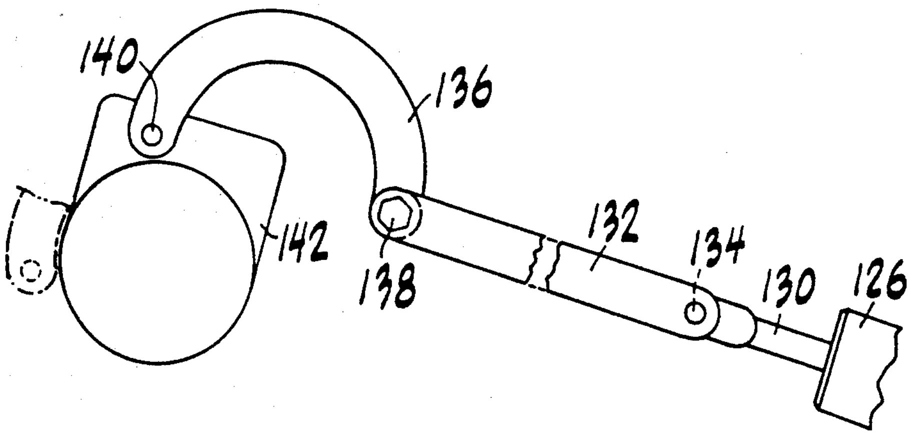
FIG. 8 is a fragmentary view of the seat-retaining mechanism of the improved walker.

Referring now to FIGS. 2 and 8, a hydraulic closure 126 on a bracket 128 carried by the leg 14. The rod 130 of the closure 126 is pivotally mounted is connected to one end of a link 132 by means of a pin 134. One end of an arcuate gate retaining member 136 is connected to the other end of the link 132 by means of a pin or the like 138. The other end of the member 136 is connected to an over center pin 140 carried by a crank plate 142 carried by the sleeve 68 (FIG. 5). While the seat is in the raised position, the gate is swung out to permit entering the walker. This moves pin 140 to an over dead center position to hold the gate in its open position. This position of the pin 140 is illustrated in dot-dash lines in FIG. 8.

Figure 9:
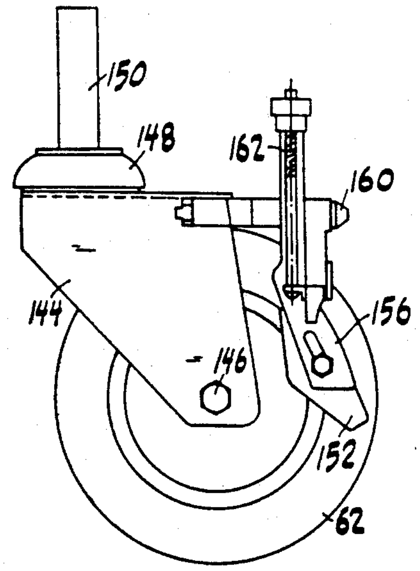
FIG. 9 is a side elevation of the front wheel of the improved walker.
Figure 10:
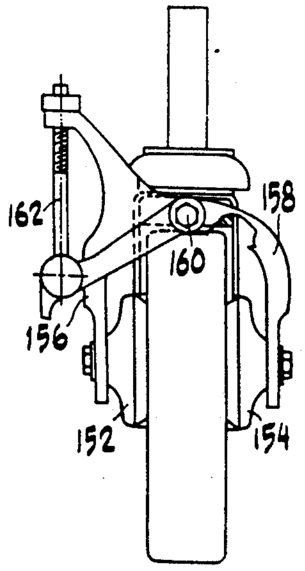
FIG. 10 is a front elevation of the wheel shown in FIG. 9 with a part broken away.

Referring now to FIGS. 9 and 10, the front wheel 62 is supported on a bracket 144 by means of an axle 146. A swivel 148 carries a pin 150 by means of which the bracket 144 is attached to a suitable receptacle in the lower end of leg 12. I provide respective brake shoes 152 and 154 are associated with the front wheel 62 to exert a predetermined amount of drag thereon. Shoes 152 and 154 are carried by respective arms 156 and 158 supported on a pivot 160 on the bracket 144. An adjusting screw 162 is adapted to be turned to move the shoes 152 and 154 toward and away from the wheel 62 to adjust the amount of drag exerted on the wheel. A similar arrangement is provided for the other front wheel. In this way the patient or other person using the walker is able to exert better control over the walker. Stated otherwise, this arrangement helps to prevent the user from losing control of the walker.

Figure 11:
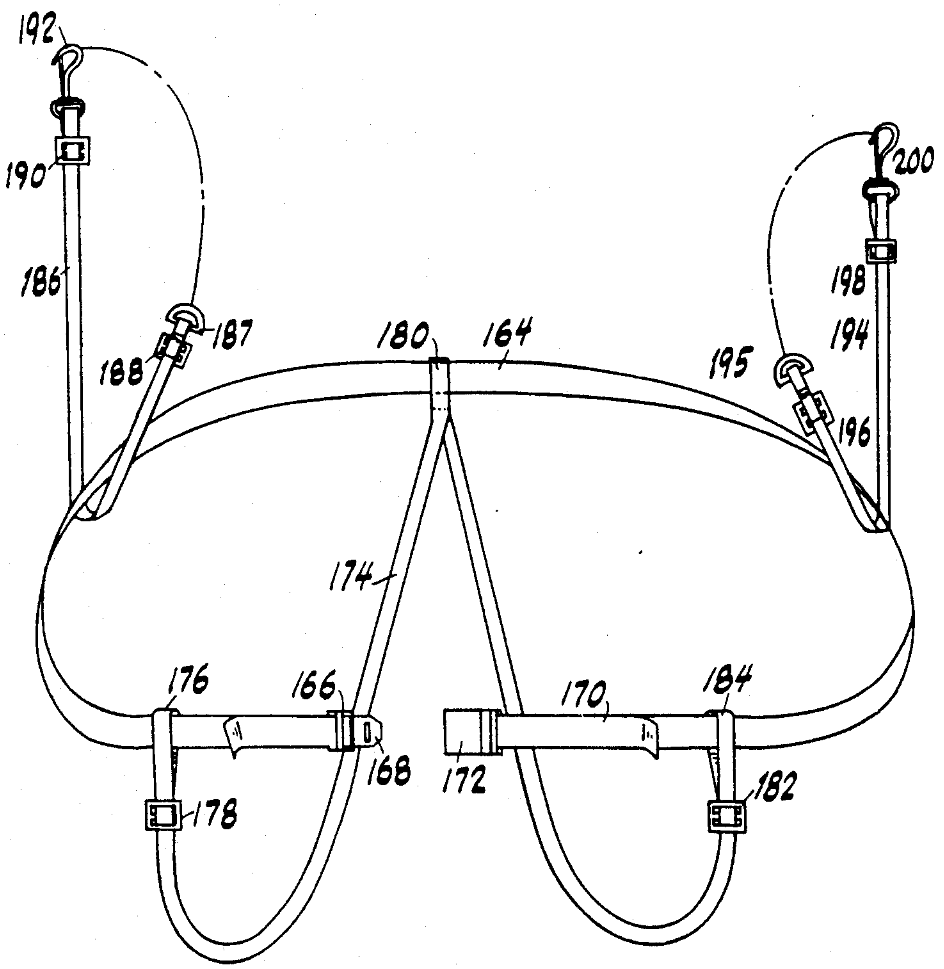
FIG. 11 is a front elevation of one form of harness which may be used with the improved walker.

Referring now to FIG. 11, there is shown a form of harness which is adapted to be used with my walker. The harness includes a waistband 164 formed of a suitable material, such for example as two-inch wide nylon webbing. One end of the webbing 164 is adjustably received in the frame 166 of a buckle tongue 168 in a manner known to the art. The other end 170 of the waistband 164 is adjustably secured to the buckle receptacle 172. Tongue 168 and its associated receptacle 172 may be of any suitable construction known to the art.

A length of webbing 174, which may for example be one inch wide nylon webbing, is formed into a pair of bights adapted to receive the wearer's legs. One end of the webbing 174 is threaded through a single bar slider 178 and then pass the end around the waistband 164 and a secure it to the central bar of the slider 178 to form a loop 176. Stitching forms a central loop 180 of webbing 174 around waistband 164. The other end of the webbing 174 is threaded through a single bar slider 182 and then pass this end around the waistband 164 and secure it to the central bar of slider 182 to form a loop 184. It will readily be appreciated that the loops 176, 180 and 184 permit the ends of the leg bights to be adjusted along the length of the waistband 164. Sliders 178 and 182 permit the lengths of the bights to be adjusted.

A harness is provided with means for supporting it on the walker frame. An adjustable loop formed in one end of a length 186 of webbing by a single bar slider 188 carries a D-ring 187. An adjustable loop formed in the other end of the length 186 by a single bar slider 190 carries a snap lock. Webbing 186 may, for example, one-inch thick webbing.

An adjustable loop formed in one end of a second length 194 of one-inch thick nylon webbing by a single bar slider 196 receives a D-ring 195. An adjustable loop formed on the other end of the length 194 by a single bar slider 198 receives a snap hook 200.

As will be explained more fully hereinbelow, after the patient has entered the walker the lengths 186 and 194 are passed over the side rails of the frame and hooks 192 and 200 are engaged respectively with rings 187 and 195. Sliders 188, 190, 196 and 198 permit the effective lengths of the webbing length. 186 and 194 to be adjusted.

In use of the improved walker and its associated harness, the user first dons the harness by stepping through the two loops formed by the webbing 174 and then secures the buckle tongue 168 into the receptacle 172. Fittings 166 and 170 permit the effective length of the waistband 164 to be adjusted to a comfortable fit. The sliders 176 and 178 permit the positions of the ends of the webbing 174 along the waistband 164 to be adjusted. Similarly, the slider 180 can be moved along the waistband 164 for the most comfortable fit.

Having donned the harness, the user is ready to enter the walker. Prior to his entry, the seat frame 88 (FIGS. 5, 6, 7) is moved to its raised position and the end of gate bar 66 is swung out of the opening 84 in the receptacle 82. With the gate open, latch 108 engages 104 so that the seat cannot be lowered.

The user next enters the walker and hooks 192 and 200 (FIG. 11) are brought over the upper side rails 28 and 30 and snapped onto D-rings 187 and 195 respectively. The adjusting fittings 188 and 190 and 196 and 198 are actuated to adjust the overall lengths of webbing 186 and 194 between the waistband 164 and the hooks 192 and 200 for most effective use of the harness. That is to say, the adjustments are such that if the user for any reason loses his footing, he will be prevented from injury by the harness.

Once the user is inside the walker, the gate bar 66 (FIGS. 6 and 7) is moved to its closed position so that the end thereof is disposed in the receptacle 82. When this is done, crank plate 142 rotates in a clockwise direction as viewed in FIG. 8 so that pin 140 moves from the dot-dash line position to the full line position shown in the Figure.

With the gate bar 66 closed, latch 108 is no longer in engagement with lock 104 so that the seat frame 88 (FIG. 5) can be lowered. To accomplish this result, lever 114 is moved in a clockwise direction as viewed in FIG. 2. When the seat is fully lowered, the interengageable stops 98 and 100 (FIG. 5) on the quill 90 and on the members 94 and 96 engage. At the same time, the lock 104 moves from the dot-dash position shown in FIG. 6 to the full line position shown therein in which it prevents the gate from being opened in the manner described hereinabove.

As the user moves with the walker, the brake shoes 152 and 154 (FIG. 10) exert drag on the front wheels as to ensure that control of the walker is not lost. Screw 162 can be operated as desired to adjust the pressure of the shoes on the associated wheel.

Further in the manner described hereinabove, the holes 50 and 52 (FIG. 4) and associated buttons 54 permit adjustment of the height of the upper frame. Similarly, holes 74 and 86 (FIG. 3) permit the height of the seat and backrest to be adjusted.

It will be seen that I have accomplished the objects of the invention have been accomplished. There is provided an improved walker which overcomes the defects of walkers of the prior art. The walker is more versatile than are walkers of the prior art. It is easy to use. It is safe.

It will be understood that certain features and subcombinations are of utility and may be employed without reference to other features and subcombinations. This is contemplated by and is within the scope of the claims. It is further obvious that various changes may be made in details within the scope of the claims without departing from the spirit of my invention. It is, therefore, to be understood that the invention is not to be limited to the specific details shown and described.

Having thus described my invention, what is claimed is:

1. An improved walker for use by a person, said walker having a front and sides and a back, said walker including in combination a pair of front legs, a pair of rear legs, respective side rails connecting said front and rear legs, a front rail connecting said front legs, a gate bar, means mounting one end of said gate bar on one of said rear legs for swinging movement of the gate bar around a generally vertical axis between an open position at which said person can enter said walker and a closed position over the back of the walker, means on the other rear leg forming a socket having a horizontally opening entryway through which the other end of said gate bar enters the socket as said gate bar moves to said closed position, a seat having a relatively rigid frame with a front and a back, means mounting said seat adjacent to the back of the frame on said gate bar for movement around a generally horizontal axis between a raised inoperative position and a lowered operative position, first interengageable means on said seat and said gate bar for limiting movement of said seat in a direction from said raised position toward and into said lowered position whereby said seat is supported in cantilever fashion on said gate bar and second interengageable means on said seat mounting means and said gate bar which operates automatically on movement of said seat to said operative position for preventing movement of said other end of said gate bar out of said socket to lock said gate bar in the closed position thereof.

2. An improved walker as in claim 1 including, means responsive to movement of said seat to said lowered position for retaining said other gate bar end in said socket.

3. An improved walker as in claim 2 including means for preventing movement of said seat to said lowered position when said gate bar is in said open position.

4. An improved walker as in claim 1 including means for preventing movement of said seat to said lowered position when said gate bar is in said open position.

5. An improved walker as in claim 1 in which said means mounting said one end of said gate bar on said one rear leg comprises a sleeve on said one rear leg, a sleeve support on said one rear leg and means for adjusting the position of said sleeve support along said one rear leg, and in which said socket forming means comprises a second sleeve on the other rear leg and means for adjusting the position of said second sleeve along the other rear leg.

6. An improved walker as in claim 1 in which said seat mounting means comprises a quill on said gate bar for supporting said seat for movement between a raised inoperative position and a lowered operative position, and in which said first interengageable means comprise respective stops carried by said gate bar adjacent to the ends thereof and means on said quill for engaging said stops in the lowered position of the seat.

7. An improved walker as in claim 6 including a member carried by said quill for rotation therewith for preventing movement of said other bar end out of said socket in the lowered position of said seat while permitting said other bar end to move out of the socket in the raised position of the seat.

8. An improved walker as in claim 7 including interengageable means on said quill and said one rear leg for preventing said seat from being lowered in the open position of the gate bar.

9. An improved walker as in claim 6 including interengageable means on said quill and said one rear leg for preventing said seat from being lowered in the open position of the gate bar.

10. An improved walker as in claim 2 including means for releasably holding said gate bar in said open position.

11. An improved walker as in claim 10 in which said legs comprise a frame and in which said releasable holding means is an over dead center device connected between said one rear leg and said frame.

12. An improved walker as in claim 1 in which said side rails are top rails, said walker including a harness having a waistband and leg loops and means for releasably attaching said harness to said side top rails.

13. An improved walker as in claim 1 including wheels on the front legs and means for applying an adjustable drag to said wheels.

14. An improved walker for use by a person, said walker including in combination a frame having an open back for permitting said person to enter the frame, a gate, means mounting the gate on the back of said frame for movement around a generally vertical axis between an open position at which said person can enter the frame and a closed position, a seat having a relatively rigid frame, means mounting said seat on said gate for movement around a generally horizontal axis between an operative position and an inoperative position and first interengageable means on said seat and said gate for limiting movement of said seat in a direction from said inoperative position toward and into said operative position whereby said seat is supported in cantilever fashion on said gate and second interengageable means on said seat and said gate which operates automatically upon movement of said seat to said operative position for locking said gate in said closed position thereof.

15. An improved walker as in claim 14 including means operative in the open position of said gate for preventing said seat from moving from said inoperative to said operative position.

* * * * *